United States Patent [19]

Stonehart et al.

[11] Patent Number: 5,208,207
[45] Date of Patent: May 4, 1993

[54] ELECTROCATALYST

[75] Inventors: Paul Stonehart, Madison, Conn.; Masahiro Watanabe, Yamanashi, Japan; Nobuo Yamamoto, Kanagawa, Japan; Toshihide Nakamura, Kanagawa, Japan; Noriaki Hara, Kanagawa, Japan; Kazunori Tsurumi, Kanagawa, Japan

[73] Assignees: Tanaka Kikinzoku Kogyo K.K., Tokyo, Japan; Stonehart Associates, Inc., Madison, Conn.

[21] Appl. No.: 841,795

[22] Filed: Feb. 26, 1992

[51] Int. Cl.$^5$ .................. B01J 23/42; B01J 23/44; B01J 23/46
[52] U.S. Cl. ........................................ 502/339; 429/44
[58] Field of Search .................. 502/185, 339, 333; 429/44

[56] References Cited

U.S. PATENT DOCUMENTS

| | | | |
|---|---|---|---|
| 3,305,402 | 2/1967 | Jones et al. | 429/44 |
| 3,352,938 | 11/1967 | Plonsker et al. | 502/185 X |
| 3,701,687 | 10/1972 | Grubb et al. | 429/44 |
| 5,096,866 | 3/1992 | Itoh et al. | 502/185 X |

FOREIGN PATENT DOCUMENTS 491143 8/1938 United Kingdom ............... 502/339

Primary Examiner—W. J. Shine
Attorney, Agent, or Firm—Sughrue, Mion, Zinn, Macpeak & Seas

[57] ABSTRACT

Disclosed is an electrocatalyst which comprises an inorganic support and a ternary alloy essentially consisting of platinum-palladium-ruthenium supported on the support. The electrocatalyst possesses excellent anti-poisoning against carbon monoxide.

1 Claim, No Drawings

ELECTROCATALYST

BACKGROUND OF THE INVENTION

The present invention relates to a ternary catalyst employed in various chemical reactions, especially employed as an electrocatalyst of a fuel cell.

A carbon catalyst supported with electrode material composed of element platinum has been widely employed as an electrocatalyst of anode of a fuel cell.

However, such reformed gas as liquefied natural gas (LNG) is employed as anode gas of a fuel cell, which contains carbon monoxide (CO).

Platinum is likely to absorb the carbon monoxide gas which results in considerable poisoning at a lower temperature.

In order to avoid the poisoning, the fuel cell is operated at a temperature of not less than 190° C. to minimize the influence of the carbon monoxide.

In this type of fuel cell having the element platinum catalyst, a reaction takes place at a higher temperature than it requires for minimizing the influence of the carbon monoxide so that various unfavorable operation conditions are compelled which are inevitably accompanied in the high temperature reaction. Further, the poisoning cannot be fully avoided even in the above conditions to invite the polarization which lowers the electrode performance.

In another fuel cell employing a solid polymer electrolyte (SPE), a lower operation temperature is required because of the weak heat resistance of the electrolyte to inevitably create the poisoning of the platinum with the carbon monoxide.

Alloy catalysts such as a platinum-palladium catalyst and a platinum-ruthenium catalyst have been known which overcome the above problems.

However, the improvements by means of these catalysts are not satisfactory and the further improvements are requested.

SUMMARY OF THE INVENTION

An object of the present invention is to provide an electrocatalyst with the excellent catalytic performance which overcomes the above drawbacks of the conventional electrocatalyst.

Another, object of the invention is to provide an electrocatalyst especially employed for an anode of a fuel cell.

A further object of the invention is to provide an electrocatalyst especially excellent in anti-poisoning against carbon monoxide.

A still further object of the invention is to provide an electrocatalyst which may be prepared at a lower cost.

The present invention is an electrocatalyst which comprises an inorganic support and a ternary alloy essentially consisting of platinum, palladium and ruthenium supported on the inorganic support.

The poisoning of a conventional electrocatalyst is remarkably large accompanied with the lowering of a cell voltage. On the contrary, the electrocatalyst of the present invention enables the operation with the poisoning of the platinum with the carbon monoxide considerably depressed.

DETAILED DESCRIPTION OF THE INVENTION

Poisoning of platinum particles with carbon monoxide can be remarkably depressed by means of an electrocatalyst of the present invention.

Although the reason thereof remains uncertain, it is conjectured that the carbon monoxide adsorbed on the surface of the ternary alloy can be easily desorbed by means of the palladium and the ruthenium to depress the poisoning.

The electrocatalyst according to the invention comprises the inorganic support and the ternary alloy essentially consisting of the platinum, the palladium and the ruthenium supported on the inorganic support. The electrocatalyst may contain a little amount of other precious metals, base metals and impurities which do not exert an adverse effect on the catalytic performance, other than the said catalyst precious metals.

The electrocatalyst is preferably composed of 10 to 50 atomic percent of platinum, 10 to 50 atomic percent of palladium and 10 to 50 percent of ruthenium, and more preferably composed of 50 atomic percent, 25 atomic percent and 25 percent in this turn, or composed of 25 atomic percent, 25 atomic percent and 50 percent in this turn.

The support on which the respective meals are supported is not especially restricted as long as it is composed of inorganic porous substance. When these metals are supported as they are, such an inorganic oxide support as silica and alumina or a carbon support can be most preferably employed.

A method of supporting these metals on the support is not especially restricted, and a conventional heat decomposition method may be employed which essentially consists of applying a solution dissolving the respective compounds of the above metals on the support, and thermally treating the support for decomposing the metal compounds to the respective metals.

However, the electrode performance is deteriorated because of the decrease of the surface area due to the agglomeration of the metals when the heat treatment is conducted. Accordingly, the electrocatalyst of the invention is preferably prepared according to a following method.

An inorganic support, preferably a carbon support, is initially impregnated with a solution of a platinum containing ion, for example, an aqueous solution of chloroplatinic acid, a solution of a palladium containing ion, for example, an aqueous solution of chloropalladimic acid and a solution of a ruthenium containing ion, for example, an aqueous solution of chlororuthenimic acid to reduce the platinum containing ion, the palladium containing ion and the ruthenium containing ion to deposit the respective metals on the carbon support, or in place of this process, prior to the impregnation of the carbon support, the chloroplatinic acid, the chloropalladimic acid and the chlororuthenimic acid are reduced and the reduced metals are deposited on the carbon support. When a strong reductant is employed in these reactions for reduction, the size of metal particles increases so that the surface area of the particles per unit weight considerably decreases.

For this reason, such a weak reductant as thiosulfuric acid, its sodium salt ($Na_2S_2O_3.5H_2O$) and its potassium salt is preferably employed to depress the decrease of the surface area of the metals.

The thiosulfuric acid, the said sodium and potassium thiosulfates react with the metal containing ion, that is, the chloroplatinic ion, the chloropalladimic ion and the chlororuthenimic ion to form finely divided metal sol having a large surface area.

This sol is then adsorbed onto the carbon support to provide the carbon support supported with the metals through appropriate procedures such as drying.

In other words, when the said solution becomes nearly opaque, the carbon support is added into the solution and then the liquid phase of the formed slurry is forced to penetrate into the pores of the carbon support by means of agitation employing, for example, a supersonic wave agitator. The thicker slurry is formed by this procedure, which remains suspended and seldom precipitates. Drying of this slurry e.g. at 75° to 80° C. for 1 to 3 days for removing water provides dried powder containing the salt of a reaction by-product. The by-product may be dissolved and removed by extracting the dried powder several times with, for instance, 100 to 200 ml of distilled water. The catalyst thus obtained has a large surface area.

EXAMPLES

The present invention will now be described in detail in connection with the following Examples. However, these Examples are not intended to limit the scope of the present invention.

EXAMPLE 1

About 10 g of a platinum alloy catalyst consisting of platinum, palladium and ruthenium in the atomic ratio of 25:25:50 was prepared by means of a following process.

Chloroplatinic acid, chloropalladimic acid and chlororuthenimic acid were dissolved into water, and 150 ml of a solution in which sodium thiosulfate was dissolved was added to the water and mixed to prepare a mixed solution.

On the other hand, 10 g of Acetylene Black to be employed as a catalyst support was suspended in 100 ml of pure water to prepare a well suspended slurry which was then added to the above mixed solution.

The slurry was dried in an oven at 75° to 80° C. overnight. The dry powder thus obtained was reduced at 250° C. for 30 minutes in a gas flow containing 10% of hydrogen (balance: nitrogen) followed by the heating at an elevated temperature of 600° C. for alloying the metals.

The particle size of the alloy was measured to be about 30 Å, and the platinum concentration in the catalyst was 5 percent in weight.

After a tetrafluoroethylene dispersion liquid was so added to the alloy catalyst that the weight proportion of the alloy catalyst to the tetrafluoroethylene became to 7:3, the mixture was applied to a carbon sheet hydrophobically treated, and was calcined to prepare an electrode.

The supporting amounts of the platinum, of the palladium and of the ruthenium were 0.1 mg/cm$^2$, 0.054 mg/cm$^2$ and 0.104 mg/cm$^2$, respectively.

After the electrode was incorporated, as an anode, in a half cell of which an electrolyte was 100 percent phosphoric acid, its electrode potentials were measured at various conditions.

The results of the measurement are summarized in Table 1.

TABLE 1

Anode Characteristics of Electrocatalyst for Fuel Cell (Unit: mV)

| Current Density | Temperature | | | | | |
|---|---|---|---|---|---|---|
| | 160° C. | | 180° C. | | 200° C. | |
| | A | B | A | B | A | B |
| 0.1 A/cm$^2$ | 5 | 3 | 4 | 2 | 2 | 1 |
| 0.2 A/cm$^2$ | 10 | 6 | 6 | 3 | 5 | 2 |
| 0.3 A/cm$^2$ | 15 | 9 | 10 | 5 | 7 | 3 |
| 0.5 A/cm$^2$ | 31 | 15 | 20 | 10 | 14 | 7 |
| 1.0 A/cm$^2$ | 60 | 28 | 40 | 20 | 27 | 13 |

A: 2% CO/28% CO$_2$/70% H$_2$;
B: 30% CO$_2$/70% H$_2$

EXAMPLE 2

Another catalyst and an electrode were prepared according to the procedures of Example 1 except that the atomic ratio of the platinum, the palladium and the ruthenium became 50:25:25, and the electrode potentials were measured. The results of the measurement are summarized in Table 2.

The platinum concentration in the catalyst was 5 percent in weight, and the supporting amounts of the platinum, of the palladium and of the ruthenium were 0.1 mg/cm$^2$, 0.27 mg/cm$^2$ and 0.26 mg/cm$^2$, respectively.

TABLE 2

Anode Characteristics of Electrocatalyst for Fuel Cell (Unit: mV)

| Current Density | Temperature | | | | | |
|---|---|---|---|---|---|---|
| | 160° C. | | 180° C. | | 200° C. | |
| | A | B | A | B | A | B |
| 0.1 A/cm$^2$ | 6 | 3 | 4 | 2 | 2 | 1 |
| 0.2 A/cm$^2$ | 12 | 6 | 6 | 4 | 6 | 3 |
| 0.3 A/cm$^2$ | 16 | 9 | 11 | 6 | 9 | 4 |
| 0.5 A/cm$^2$ | 29 | 13 | 22 | 11 | 15 | 8 |
| 1.0 A/cm$^2$ | 59 | 25 | 42 | 19 | 30 | 14 |

A: 2% CO/28% CO$_2$/70% H$_2$;
B: 30% CO$_2$/70% H$_2$

COMPARATIVE EXAMPLE 1

A catalyst was prepared according to the same procedures as those of Example 1 except that only platinum was supported employing the amount twice of the platinum of Example 1.

The platinum concentration was 10 percent in weight. The supported amount of the platinum in the electrode was 0.2 mg/cm$^2$.

The electrode potentials were measured similarly to Example 1 employing the said electrode. The results are shown in Table 3.

TABLE 3

Anode Characteristics of Electrocatalyst for Fuel Cell (Unit: mV)

| Current Density | Temperature | | | | | |
|---|---|---|---|---|---|---|
| | 160° C. | | 180° C. | | 200° C. | |
| | A | B | A | B | A | B |
| 0.1 A/cm$^2$ | 10 | 6 | 7 | 4 | 5 | 3 |
| 0.2 A/cm$^2$ | 20 | 12 | 14 | 9 | 10 | 6 |
| 0.3 A/cm$^2$ | 31 | 18 | 23 | 14 | 16 | 10 |
| 0.5 A/cm$^2$ | 63 | 29 | 49 | 22 | 31 | 16 |
| 1.0 A/cm$^2$ | 130 | 62 | 96 | 55 | 72 | 40 |

A: 2% CO/28% CO$_2$/70% H$_2$;
B: 30% CO$_2$/70% H$_2$

COMPARATIVE EXAMPLE 2

A catalyst was prepared according to the same procedures as those of Example 1 except that the amount of the platinum was made to be one and one-half of that of Example 1 so that the atomic ratio of the platinum to the palladium in the catalyst was 50:50. The platinum concentration was 7.5 percent in weight. The supported amount of the platinum in the electrode was 0.15 mg/cm$^2$.

The electrode potentials were measured similarly to Example 1 employing the said electrode. The results are shown in Table 4.

TABLE 4

Anode Characteristics of Electrocatalyst for Fuel Cell (Unit: mV)

| Current Density | Temperature | | | | | |
|---|---|---|---|---|---|---|
| | 160° C. | | 180° C. | | 200° C. | |
| | A | B | A | B | A | B |
| 0.1 A/cm$^2$ | 6 | 4 | 5 | 3 | 4 | 2 |
| 0.2 A/cm$^2$ | 18 | 7 | 10 | 6 | 8 | 5 |
| 0.3 A/cm$^2$ | 28 | 13 | 20 | 10 | 14 | 9 |
| 0.5 A/cm$^2$ | 46 | 21 | 36 | 16 | 23 | 12 |
| 1.0 A/cm$^2$ | 90 | 40 | 70 | 33 | 49 | 25 |

A: 2% CO/28% $CO_2$/70% $H_2$;
B: 30% $CO_2$/70% $H_2$

TABLE 5

Anode Characteristics of Electrocatalyst for Fuel Cell (Unit: mV)

| Current Density | Temperature | | | | | |
|---|---|---|---|---|---|---|
| | 160° C. | | 180° C. | | 200° C. | |
| | A | B | A | B | A | B |
| 0.1 A/cm$^2$ | 6 | 4 | 6 | 2 | 3 | 2 |
| 0.2 A/cm$^2$ | 15 | 7 | 10 | 6 | 7 | 4 |
| 0.3 A/cm$^2$ | 22 | 12 | 16 | 9 | 12 | 8 |
| 0.5 A/cm$^2$ | 41 | 20 | 32 | 16 | 20 | 10 |
| 1.0 A/cm$^2$ | 87 | 39 | 68 | 34 | 45 | 22 |

A: 2% CO/28% $CO_2$/70% $H_2$;
B: 30% $CO_2$/70% $H_2$

COMPARATIVE EXAMPLE 3

A catalyst was prepared according to the same procedures as those of Example 1 except that the palladium was replaced with ruthenium so that the atomic ratio of the platinum to the ruthenium in the catalyst was 50:50.

The platinum concentration was 7.5 percent in weight. The supported amount of the platinum in the electrode was 0.15 mg/cm$^2$.

The electrode potentials were measured similarly to Example 1 employing the said electrode. The results are shown in Table 5.

From Tables 1, 2 and 3, it is apparent that the electrode potential of the platinum-palladium-ruthenium ternary alloy catalyst of Examples 1 and 2 is about one-half of that of the element platinum catalyst of Comparative Example 1 at a current density of not less than 0.5 A/cm$^2$, and this comparison proves the excellence of the electrode properties of Examples.

From Tables 1, 2, 4 and 5, it is apparent that the excellence of the ternary alloy catalysts of Examples 1 and 2 can be proved when these catalysts are compared with the conventional binary alloys of Comparative Examples 2 and 3 consisting of the platinum and the palladium and of the platinum and ruthenium.

What is claimed is:

1. An electrocatalyst which comprises an inorganic support and a ternary alloy essentially consisting of 10 to 50 atomic percent of platinum, 10 to 50 atomic percent of palladium and 10 to 50 atomic percent of ruthenium.

* * * * *